US008692497B2

(12) United States Patent
Vogel et al.

(10) Patent No.: US 8,692,497 B2
(45) Date of Patent: Apr. 8, 2014

(54) AUTOMATIC FURNITURE FLAP TYPE DETECTION

(75) Inventors: Thomas Vogel, Lustenau (AT); Christian Theimer, Dornbirn (AT)

(73) Assignee: Julius Blum GmbH, Hochst (AT)

( * ) Notice: Subject to any disclaimer, the term of this patent is extended or adjusted under 35 U.S.C. 154(b) by 0 days.

(21) Appl. No.: 13/031,814

(22) Filed: Feb. 22, 2011

(65) Prior Publication Data

US 2011/0169388 A1 Jul. 14, 2011

Related U.S. Application Data

(63) Continuation of application No. PCT/AT2009/000277, filed on Jul. 16, 2009.

(30) Foreign Application Priority Data

Aug. 29, 2008 (AT) .................................... 1352/2008

(51) Int. Cl.
*G05D 3/00* (2006.01)

(52) U.S. Cl.
USPC ..... 318/466; 318/266; 312/319.2; 312/319.5; 312/305; 388/909

(58) Field of Classification Search
USPC ......... 318/560, 400.04, 266, 280, 466; 254/1; 16/286, 59; 312/319.5, 305, 319.2; 388/909
See application file for complete search history.

(56) References Cited

U.S. PATENT DOCUMENTS

| | | | | |
|---|---|---|---|---|
| 5,076,231 | A * | 12/1991 | Buchl | 123/399 |
| 6,078,153 | A | 6/2000 | Voehringer et al. | |
| 6,553,621 | B2 | 4/2003 | Isele | |
| 6,771,178 | B2 * | 8/2004 | Bruzy et al. | 340/648 |
| 7,108,301 | B2 * | 9/2006 | Louvel | 292/336.3 |
| 7,168,477 | B2 * | 1/2007 | Salice | 160/213 |
| 7,573,215 | B2 * | 8/2009 | Hillen | 318/280 |
| 8,066,341 | B2 * | 11/2011 | Brustle | 312/319.5 |
| 2004/0006918 | A1 | 1/2004 | Fitzgibbon | |
| 2008/0005913 | A1 * | 1/2008 | Kachouh | 33/1 PT |
| 2008/0122332 | A1 | 5/2008 | Brustle | |
| 2008/0172834 | A1 | 7/2008 | Sutterlutti | |

FOREIGN PATENT DOCUMENTS

| | | | |
|---|---|---|---|
| AT | 505 126 | 5/2009 | |
| CN | 101061287 | 10/2004 | |
| DE | 196 15 125 | 10/1997 | |
| DE | 101 25 748 | 12/2002 | |
| DE | 20 2006 000 535 | 4/2006 | |
| EP | 1 128 012 | 2/2001 | |
| WO | 2004/008021 | 1/2004 | |
| WO | 2006/099645 | 9/2006 | |
| WO | WO 2006099645 A1 * | 9/2006 | E05D 15/46 |
| WO | 2007/035971 | 4/2007 | |
| WO | 2008/134786 | 11/2008 | |

OTHER PUBLICATIONS

International Search Report issued Oct. 7, 2009 in International (PCT) Application No. PCT/AT2009/000277.

Austrian Patent Office Search Report dated Jul. 2, 2009 issued in Austrian Patent Application No. A 1352/2008.

* cited by examiner

*Primary Examiner* — Antony M Paul

(74) *Attorney, Agent, or Firm* — Wenderoth, Lind & Ponack, L.L.P.

(57) ABSTRACT

Electromotive furniture-flap drive, characterized by an identification device for automatically identifying the type of furniture flap in the installed state of the furniture flap drive.

19 Claims, 16 Drawing Sheets

7
25
A 25
9
A (1 : 1)

8
30
HF 8
10, 30
HS 8
10, 30
HL 1
11

3

3

3

A (1:1)

AUTOMATIC FURNITURE FLAP TYPE DETECTION

This application is a Continuation of International application No. PCT/AT2009/000277, filed Jul. 16, 2009, the entire disclosure of which is incorporated herein by reference.

BACKGROUND OF THE INVENTION

The present invention concerns an electric-motor furniture flap drive. A furniture flap drive of that kind is disclosed for example in Austrian patent application No A 696/2007.

At the present time, furniture flap drives are on the market in different design configurations, depending on which respective type of furniture flap is to be driven by the furniture flap drive. As described in detail in DE 20 2006 000 535 U1, furniture flaps are now known in different design configurations or types.

Thus, for example, there are furniture flaps which have become known as top upwardly pivotable flaps in which the flap is fixed by hinges to the underside of the cupboard top.

In addition, there are flaps which have a two-part structure, wherein a first flap portion is hingedly rotatably connected to the furniture carcass and a second flap portion is hingedly rotatably connected to the first flap portion. When the flap is moved into the open position, the first flap portion is pivoted upwardly away from the furniture carcass, while the second flap portion is also pivoted upwardly towards the furniture carcass so that the flap is folded together in the open position (upwardly foldable flap).

In the case of top upwardly pivotable flaps, the flap is pivoted rearwardly beyond the furniture carcass.

If the flap preferably performs a movement throughout its entire opening or closing travel in substantially parallel relationship with the front side of the furniture carcass, that is referred to as an upward lift flap.

That terminology is also to be employed in the context of the present invention, in which respect the list of different types of furniture flaps is not to be interpreted as being final.

The advantage of the above-mentioned Austrian patent application No 696/2007 is that it is possible to be able to replace a defective electric drive, arranged in the first component, of a furniture flap drive without having to remove the second component of the furniture flap drive, which has the control arm and can also be referred to as the mechanical control unit, from the furniture carcass.

Depending on the respective type of furniture flap, different mechanical control units are used, which differ from each other in particular in the differing design of the control lever or the lever mechanism of which the control lever is a part in order to be able to perform the respective characteristic movement of the furniture flap. The mechanical control unit is usually also always provided with a spring pack serving to compensate for or take out the weight of the furniture flap within certain limits.

In the state of the art, it is necessary to manually establish what type of flap is involved in order, for example, to implement different presettings at the electric motor, depending on the type of furniture flap that the electric motor is to be used to drive. That applies both in regard to furniture flap drives which are designed in one piece and also in relation to those which are designed in two pieces, as are shown in Austrian patent application No A 696/2007. That entails the problem that under some circumstances this can involve incorrect input of operating parameters or the like.

The object of the invention is to overcome the above problem.

SUMMARY OF THE INVENTION

That object is attained by a furniture flap drive having the features of the present invention.

By virtue of the provision of an identification device for automatically identifying the type of furniture flap, the furniture flap drive itself can detect the furniture flap type in relation to which it is to be used. As it is possible for the desired operating parameters to be made available beforehand for each furniture flap drive in an electronic memory of the furniture flap drive the furniture flap drive, after identification has been effected, can automatically select the correct operating parameters. There is therefore no possibility of manual incorrect input.

The identification device can be implemented in many different ways. Automatic identification of the furniture flap type must function at least in the installed condition of the furniture flap drive. Depending on the respective structure of the identification device it will be noted however that it is even possible to establish, prior to installation of the furniture flap drive in a furniture carcass, the type of furniture flap in relation to which the furniture flap drive is to be used. That is the case in particular in relation to two-part furniture flap drives when the identification device already derives the furniture flap type which is involved, from characteristics of the second component which has the control arm and which is of a different configuration for each type of furniture flap. In itself however it is sufficient if identification of the furniture flap type occurs only in the installed condition of the furniture flap drive.

Further advantageous embodiments of the invention are defined in the appendant claims.

The invention can be used in particularly advantageous fashion if it is provided that the furniture flap drive has a first component having the electric motor and a second component having the control arm, wherein the first and second components can be releasably fixed to each other.

Based on the fact that the fronts of the furniture flaps, in the case of the individual types thereof, move away from the furniture carcass to differing distances during the opening process the identification device can be designed so that, using at least one optical sensor with which it is in communication, it detects how far the furniture flap moves away from the furniture carcass and infers the type of furniture flap therefrom.

Alternatively, it can be provided that the identification device, using at least two inductive sensors arranged along the pivotal range of the control arm (preferably in the proximity of the pivot point) identifies the type of furniture flap. Depending on which respective one of the sensors has the control arm moving thereover, it is possible to determine which type of furniture flap is involved.

Once again alternatively it can be provided that the second component has a coding which codes the type of flap for which the second component is intended, wherein the first component has a reading device for reading off the coding, which is connected to the identification device.

In a particularly preferred embodiment of the invention, it is provided that the identification device is connected to a travel measuring device, preferably an angle measuring device, by which the travel covered by the furniture flap or by the control arm between its two end positions (closed or lower end position and open or upper end position), preferably the corresponding angle, can be determined. The identification device identifies the type of flap in dependence on the measurement result from the travel measuring device.

That embodiment makes use of the realization that different types of furniture flaps differ from each other by travel paths of differing length, which can be covered by the control arm or the furniture flap between its two end positions (closed position of the furniture flap and open position of the furniture flap). Thus, for example, the angular range which can be covered in the case of an upwardly foldable flap (UFF) is about 120°. In the case of an upward lift flap (ULF), it is about 140° while in the case of an upwardly pivotable flap (UPF), the control arm can cover an angular range of about 130°. Those angles are each measured starting from that position at which the furniture flap bears against the furniture carcass (possibly while maintaining a slight gap in relation to the furniture carcass to permit touch-latch triggering) on the furniture carcass in the closed end position. Angle measurement can optionally also be effected starting from a notional straight line extending vertically through the pivot point of the control arm. The actual concrete numbers can change somewhat as a result.

Quite generally it will be appreciated that the precise angles can differ from each other depending on the respective manufacturer or it may be possible that other types of furniture flaps than those referred to hereinbefore are to be distinguished from each other. That, however, does not represent any problem as only a finite number of prior known different mechanical control units which can be combined with the first component which has the electric drive are in fact available for a given furniture flap drive. It is therefore only necessary to measure at the factory once for each of the types of flap which are to be distinguished from each other, what travel path or what angular range the control arm or the furniture flap can respectively cover for each of the types of flap.

It will be appreciated that it would be conceivable to use not only one of the above-mentioned identification options, but for two or more of the stated identification processes to be carried out at the same time. Generally however that will not be necessary.

Irrespective of the design configuration adopted for the identification device, it can be provided that the furniture flap drive, in dependence on the identification performed by the identification device, establishes control or regulating parameters, for example speed profiles (that is to say for example the angular speed and/or angular acceleration in dependence on the pivotal angle of the control arm or in dependence on time) or the like, for an electric motor.

In a further advantageous embodiment of the invention there is provided a collision monitoring device for detecting a collision of the furniture flap driven in the installed condition by the furniture flap drive with the furniture carcass or a foreign body.

In that respect it can be provided that the collision monitoring device has a speed measuring device and/or an acceleration measuring device for the control arm.

Protection is also sought for an article of furniture having a furniture drive flap in accordance with one of the aforementioned embodiments, wherein the control arm is connected to a furniture flap.

BRIEF DESCRIPTION OF THE DRAWINGS

Further advantages and details of the invention will be apparent from the Figures and the related specific description. In the Figures.

DETAILED DESCRIPTION OF THE INVENTION

Figure 1A:
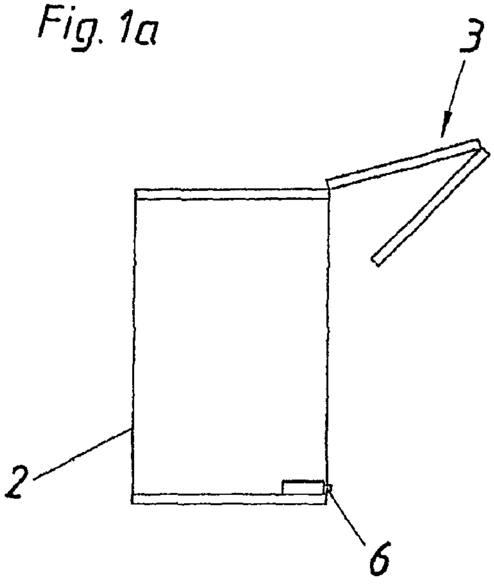
FIGS. 1*a*, 1*b* and 1*c* show three different types of furniture flap by way of example.
Figure 2A:
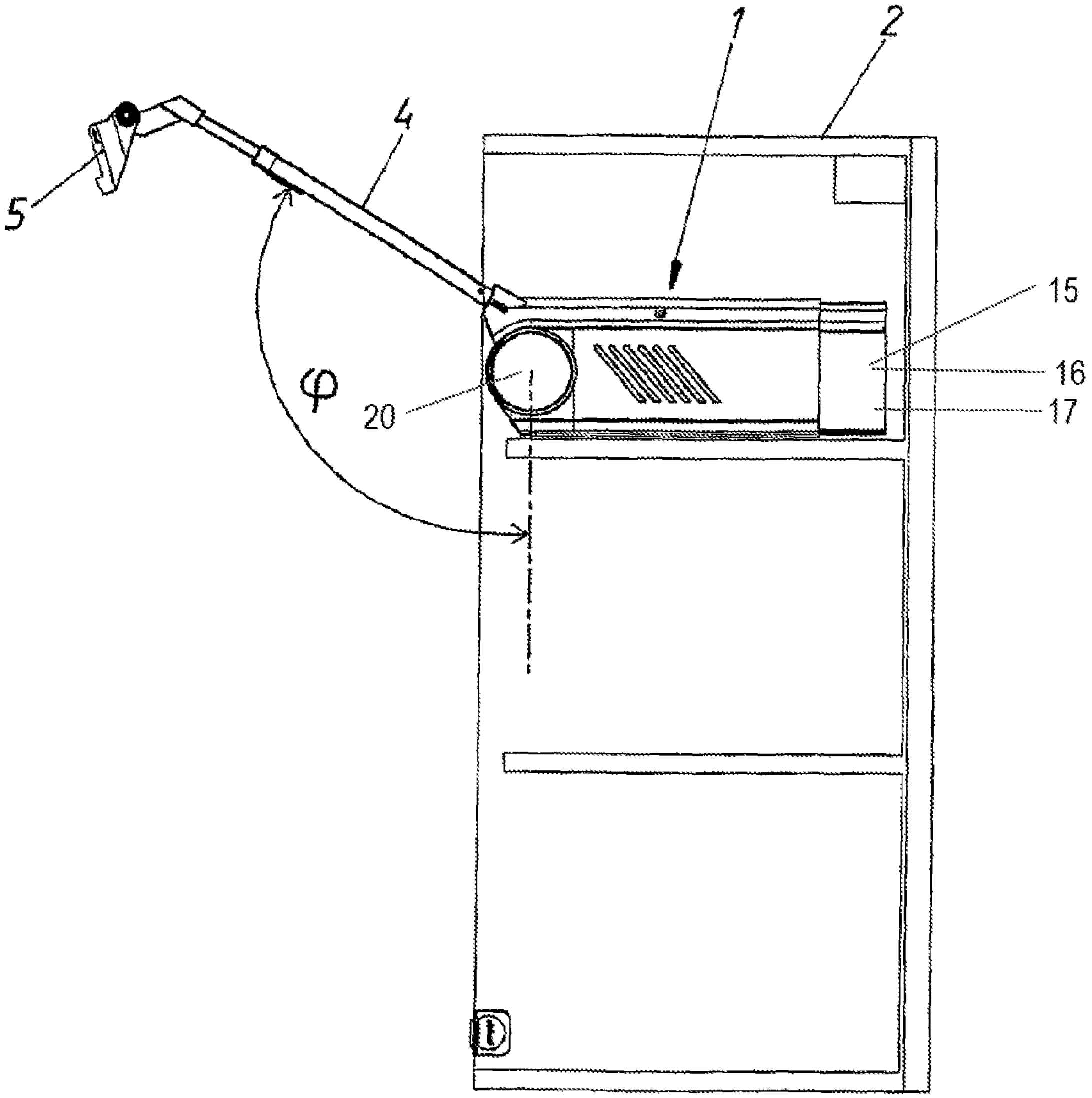
FIGS. 2*a*, 2*b* and 2*c* show the configuration of the furniture flap drive for each of the types of furniture flap shown in FIGS. 1*a*, 1*b* and 1*c*, FIGS. 3*a* and 3*b* show a flow chart (divided up for reasons of space) of a concrete example of an identification of the type of furniture flap by means of a travel measuring device, wherein a collision monitoring device is additionally initialized.

FIG. 1*a* shows a furniture flap 3 mounted movably on a furniture carcass 2, in the form of an upwardly foldable flap (UFF). The corresponding configuration of the furniture flap drive is shown in FIG. 2*a*. In this case the angle ϕ is measured between notional straight lines of which one extends parallel to the longitudinal extent of the control arm 4. The second straight line extends at least approximately vertically and through the pivot point of the control arm 4. The furniture flap 3 shown in FIG. 1*a* can be fixed to the plate 5.

Figure 1C:
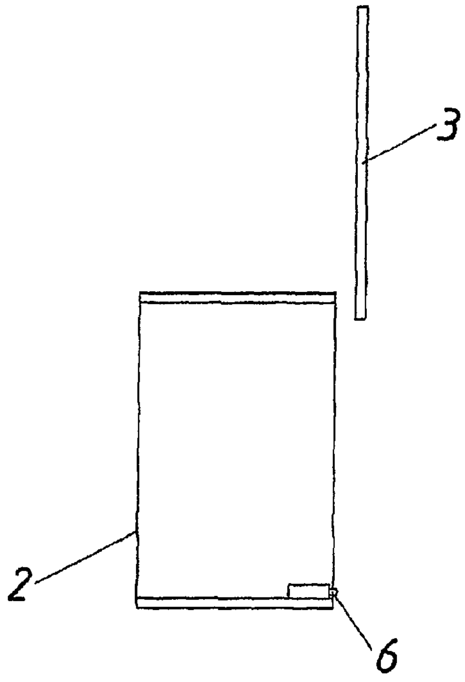
Figure 1B:
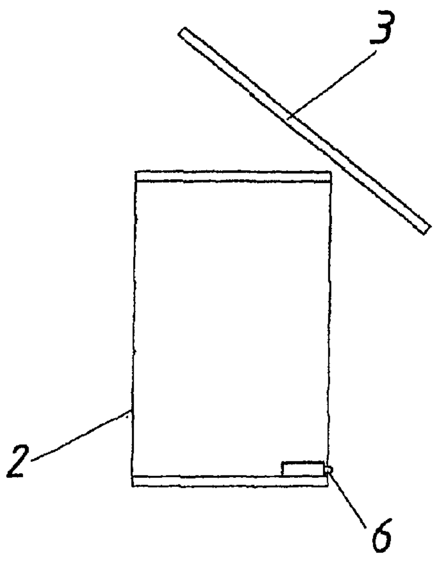
Figure 2B:
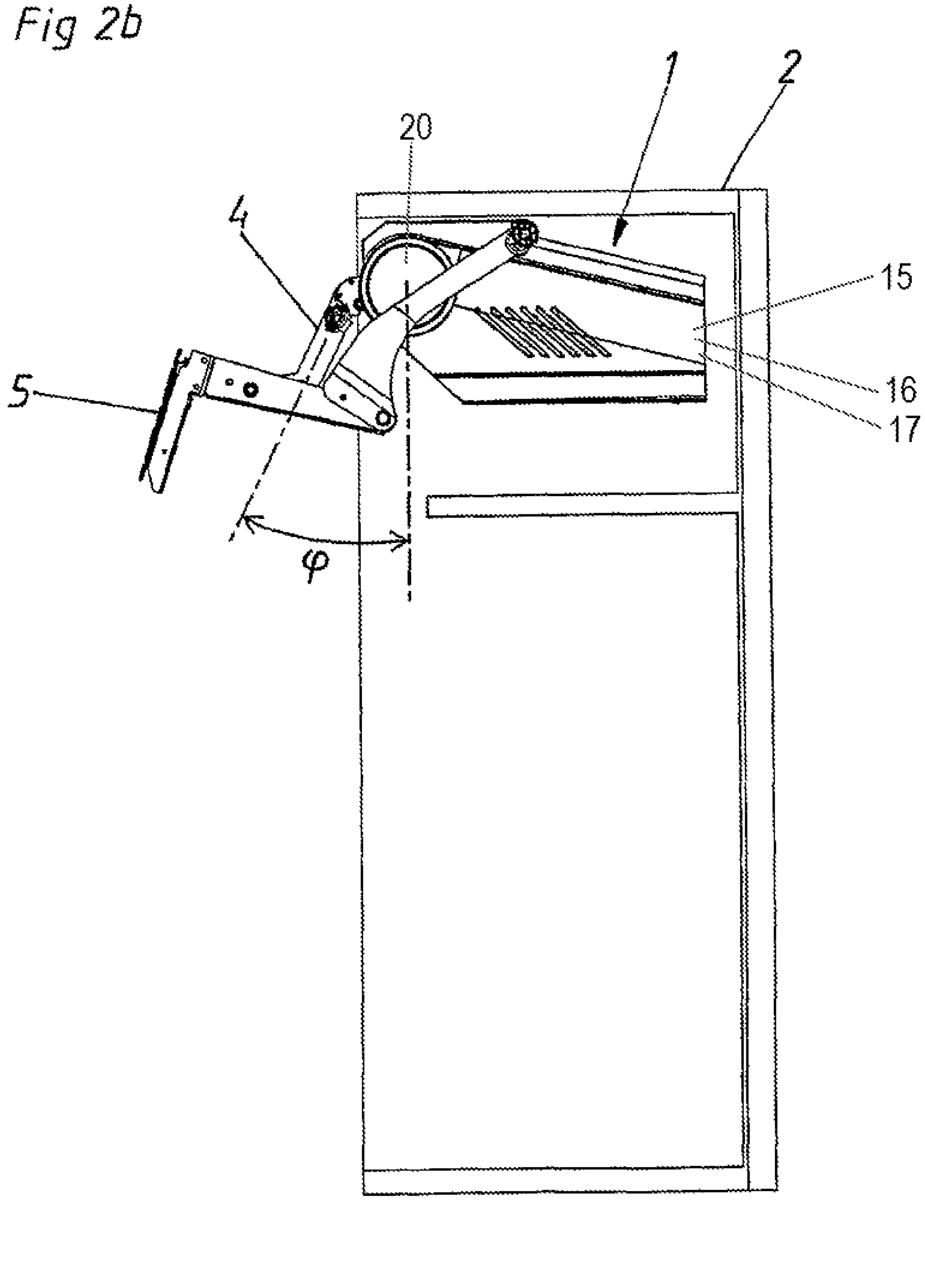
Figure 2C:
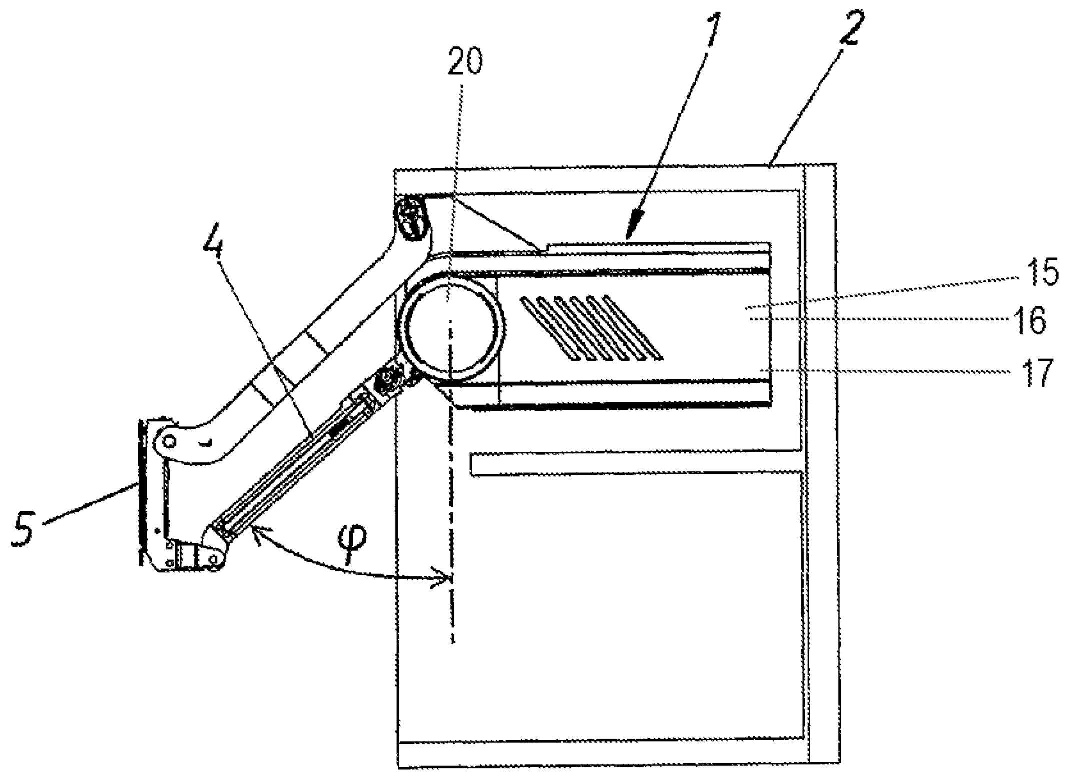

FIGS. 1*b* and 2*b* show the corresponding views for an upwardly pivotable flap (UPF). FIGS. 1*c* and 2*c* show the corresponding views for an upward lift flap (UPF).

It can be seen that the precise structure of the lever mechanism is different by virtue of the different, respectively desired movement characteristic of the furniture flap 3. In each case, however, electric-motor 20 driving of the movement of the furniture flap is effected by the control arm 4.

Figure 3A:
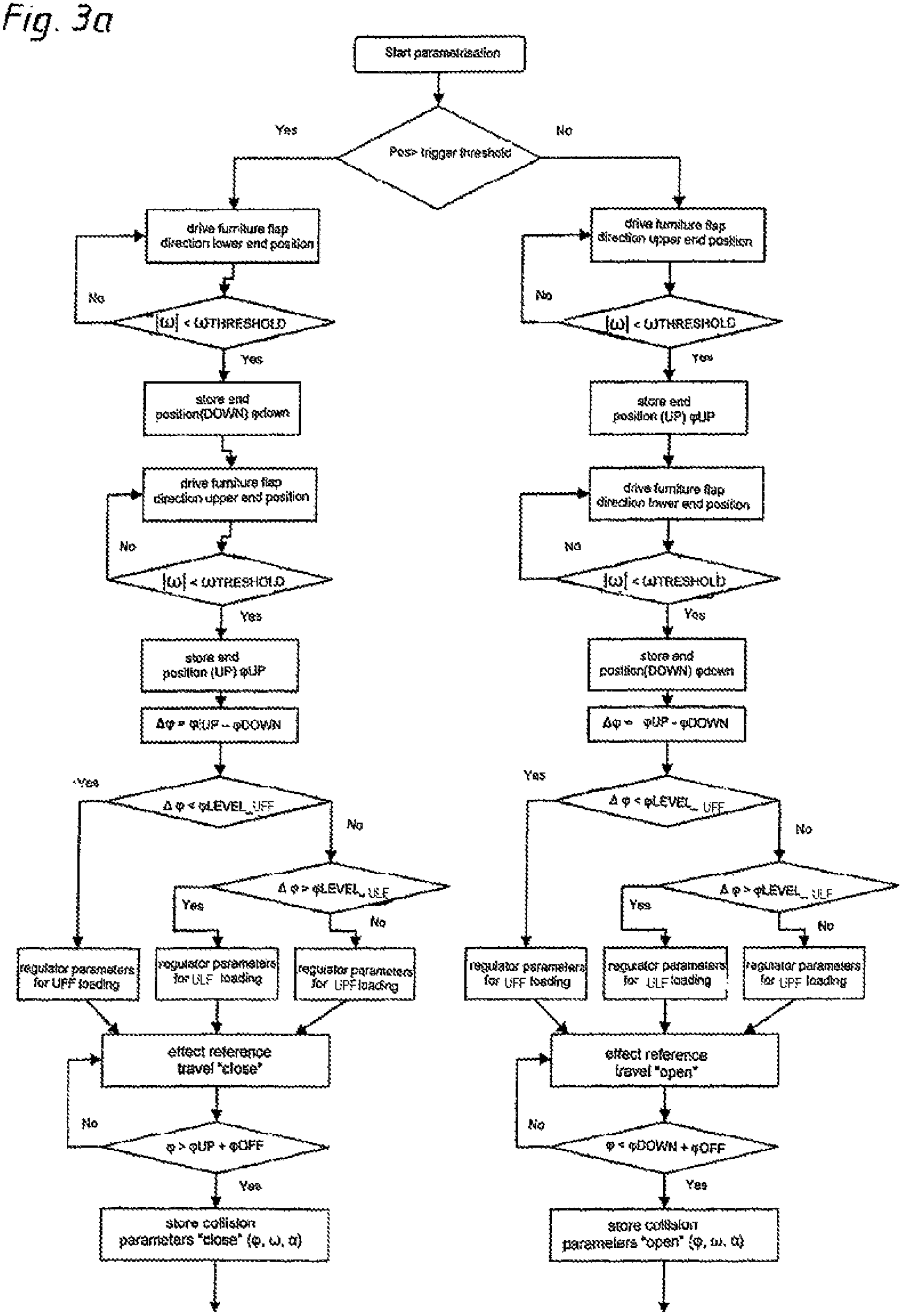
Figure 3B:
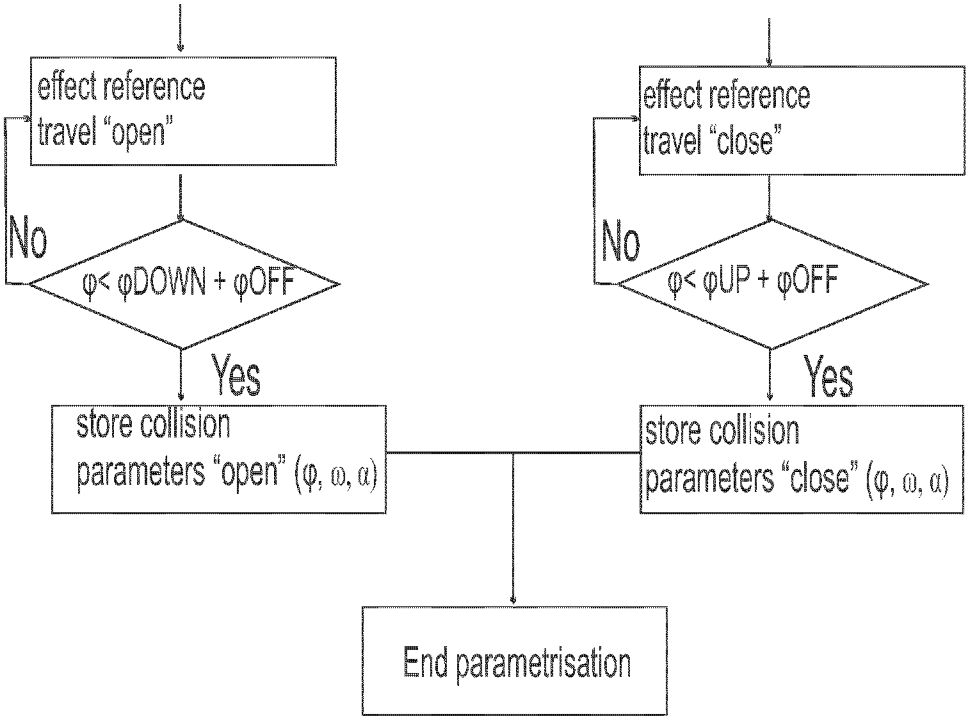

FIGS. 3*a* and 3*b* show a flow chart for automatic parametrisation of the electric motor 20 based on the automatically identified respective type of furniture flap. In that case, by way of example, the arrangement uses an identification device 15 which infers the respective type of flap from the angular range ϕ which can be covered by the control arm 4 or the furniture flap 3 between both end positions. A control unit 17 then establishes control or regulating parameters for the electric motor 20 based on the identification of the type of flap by the identification device 15. At the start of the parametrisation procedure, the furniture flap 3 should be in an intermediate position between the two end positions.

The beginning involves a binary query as to whether the position of the furniture flap 3 is greater (the direction away from the furniture carcass 2 is to be considered hereinafter as the positive direction) than a predetermined trigger threshold of a travel measuring device (i.e., farther from the furniture carcass than the trigger threshold). The travel measuring device 16 here is in the form of a rotary potentiometer which measures absolute angle values in the form of increments and forwards them to the identification device 15. It is also to be mentioned that a CPU of the identification device 15 as well as electronic memories and possibly further circuits can be provided in all embodiments of the invention on the motherboard of the electric-motor furniture flap drive, for example in the control or regulating device thereof.

Depending on whether the furniture flap is respectively closer in the open position (left-hand arm of the flow chart) or closer in the closed position (right-hand arm of the flow chart), the result of the query is either 'yes' or 'no'. The furniture flap 3 is then driven by the electric motor in the direction of the more remote end position until the absolute value of the angular speed of the control arm falls below a predetermined threshold value $\omega_{THRESHOLD}$. When the absolute value falls below that threshold, it is known that the furniture flap has arrived at the closed (lower) or open (upper) end position (hereinafter only the left-hand arm is to be discussed, the right-hand arm takes place in a similar fashion). The value then outputted by the rotary potentiometer is stored as $\phi_{DOWN}$. The furniture flap 3 is then driven in the direction of the upper (open) end position, more specifically once again until it bears against the furniture carcass 2, which in turn is manifested by the fact that the absolute magnitude of the angular speed of the control arm 4 falls below the predetermined threshold value (THRESHOLD. The measurement value of the rotary potentiometer which is then present is stored as the upper end position $\phi_{UP}$. The total angular range $\Delta\phi$ which can be covered by the control arm is ascertained from the difference between $\phi_{DOWN}$ and $\phi_{UP}$. By referring to two binary queries, it is now decided which of, in this case three possible types of furniture flap (UFF, ULF or UPF) is involved. As an upward fold flap (UFF) has the shortest angular range which can be covered, it is first queried whether the total angular range $\Delta\phi$ which can be covered is less than the total angular range $\phi_{LEVEL\_UFF}$ that is to be expected for an upwardly foldable flap (UFF). If that is the case, identification is concluded positively and the desired regulating parameters for an upwardly foldable flap (UFF) can be loaded. If that is not the case, then the flap cannot therefore be an upwardly foldable flap. A query is then made as to whether the total angular range $\Delta\phi$ which can be covered is greater than the total angular range $\phi_{LEVEL\_ULF}$ which is to be expected for an upward lift flap (ULF). If that is the case, the furniture flap 3 is positively identified as an upward lift flap (ULF) and the corresponding regulating parameters can be loaded. If that is not the case, then the arrangement must involve an upwardly pivotable flap (UPF) and it is possible in turn to load the required regulating parameters. Naturally, that presupposes knowing beforehand that the corresponding furniture flap drive 1 is to be used from the outset only in relation to those three different types of furniture flap. Otherwise correspondingly more queries would have to be made.

After positive identification has been effected, it is possible to perform a reference travel 'close'. That is effected until the angular range $\phi$ covered is greater than the difference $\phi_{UP}-\phi_{OFF}$. When that condition is met, the collision parameters ascertained in that way for the closing movement, here for example the number triplet $\phi$, $\omega$, $\alpha$, can be stored. In that case, the corresponding collision parameters do not in any way have to be continuously recorded, but it is sufficient to record them for given discrete measurement points. $\phi_{OFF}$ involves an offset angle which is used to place the switch-off position of the electric motor somewhat before the respective end position so that no collision with the furniture carcass 2 occurs.

Then (FIG. 3*b*) a corresponding reference travel is performed for the opening movement. The collision parameters ascertained in that way can also be stored.

The entire procedure takes place in a similar fashion (right-hand arm) if initially the flap was rather in the closed position.

Figure 4A:
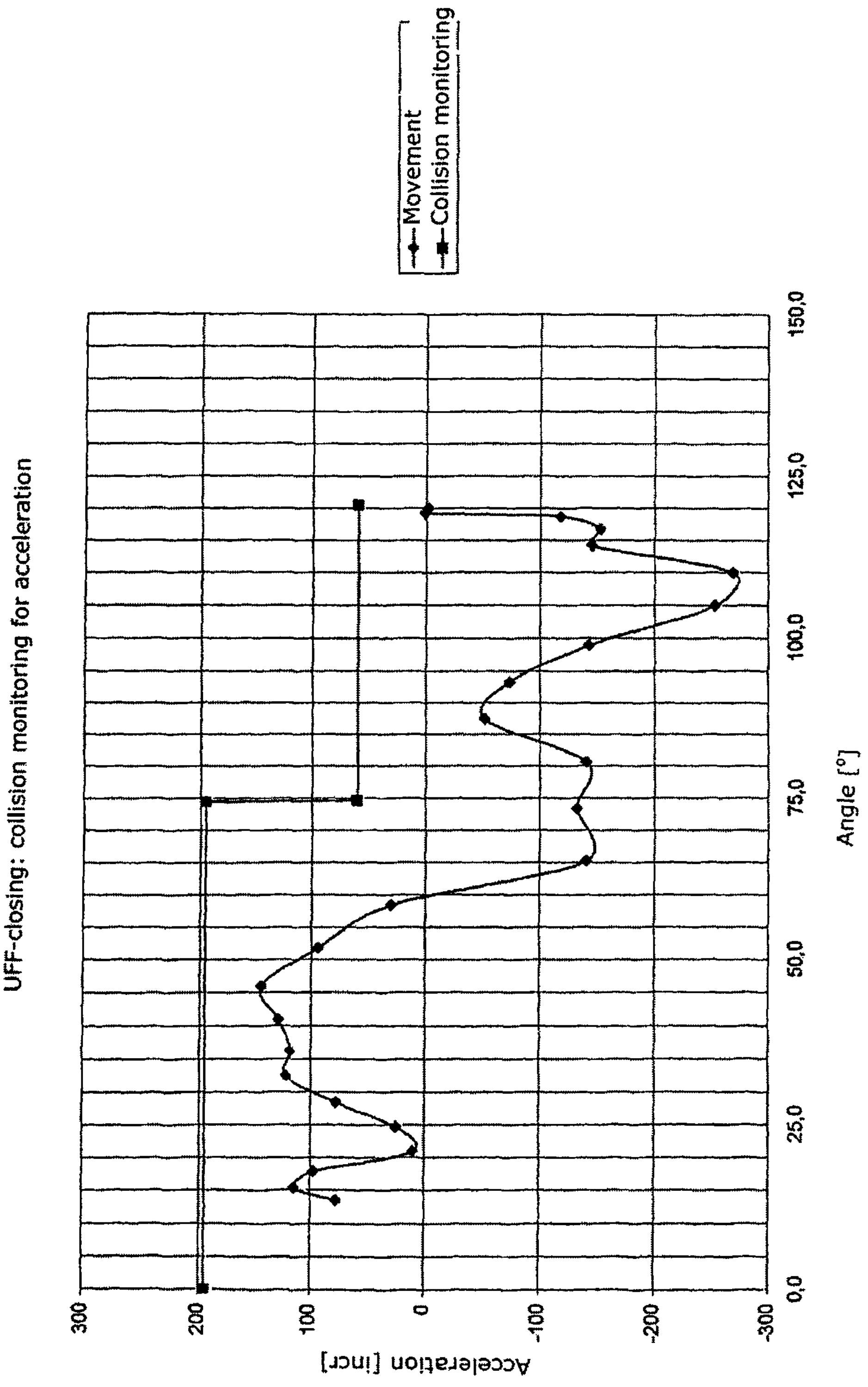
FIGS. 4*a*, 4*b*, 4*c* and 4*d* show examples in connection with collision monitoring in the case of an UFF furniture flap.

Examples of the collision parameters recorded during the reference travel 'close' for the angular acceleration $\alpha$ are shown in FIG. 4*a*. It is to be noted that the collision monitoring device 35, based on the measured angular acceleration while observing a certain offset, establishes that step function which is then to be used for collision monitoring.

Figure 4B:
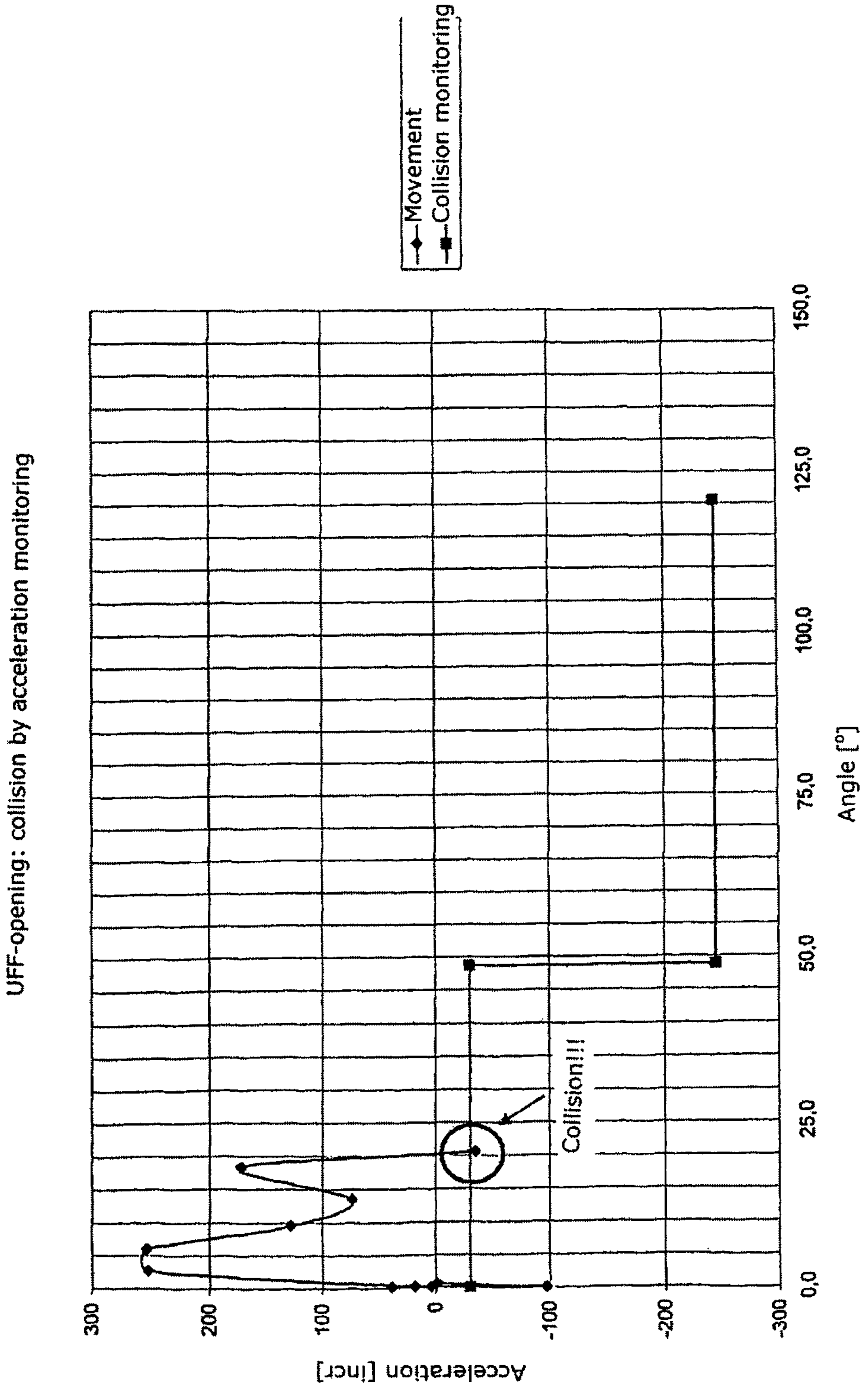

A collision may involve a 'regular' collision between the furniture flap 3 and the furniture carcass 2. However, it is also possible for foreign bodies such as the hand of a user to be involved in a collision. An example of a collision which has occurred during the process of opening an upwardly foldable flap and which is detected by the acceleration monitoring means is shown in FIG. 4*b*.

Figure 4C:
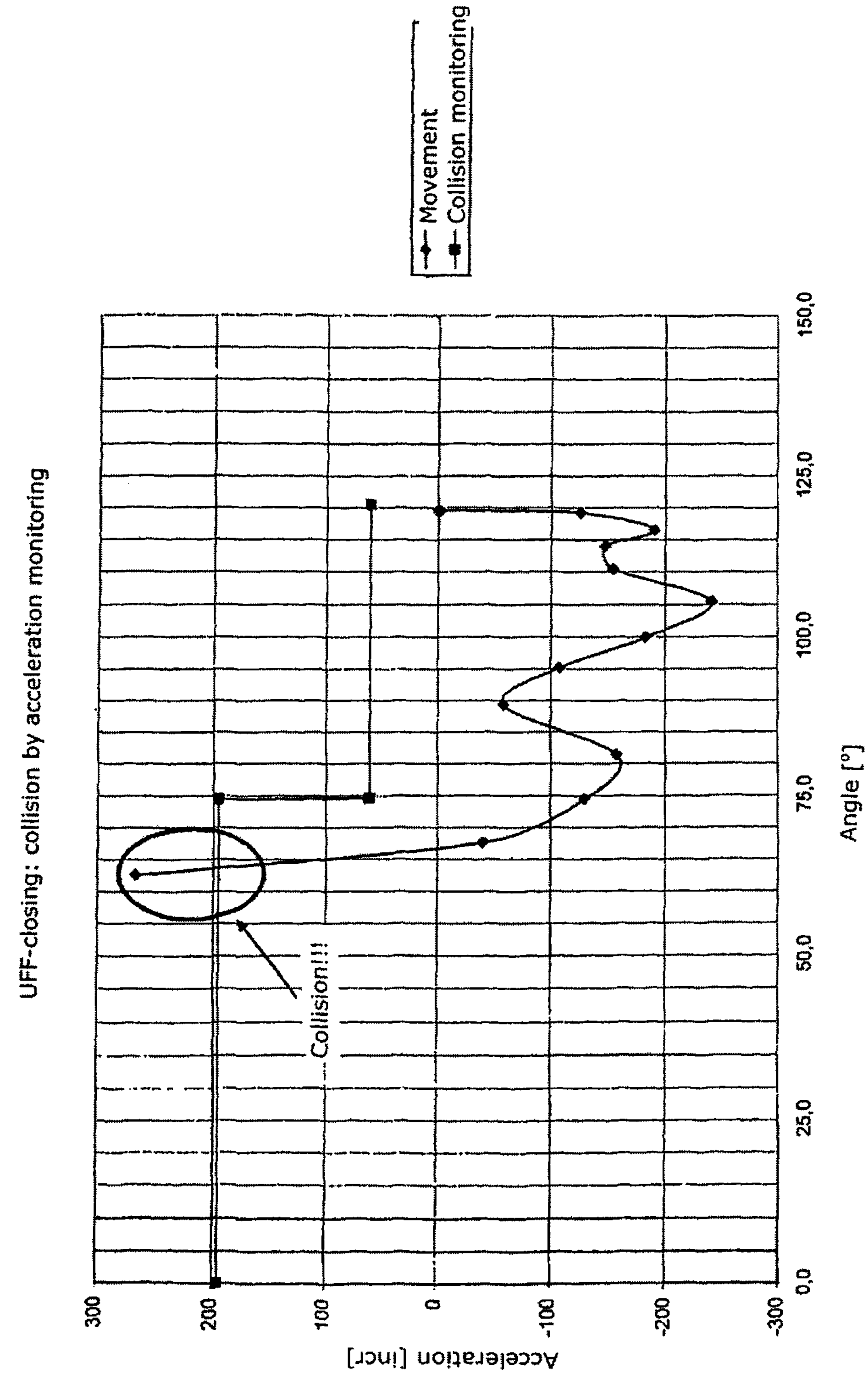

A corresponding example for the closing movement is shown in FIG. 4*c*.

Figure 4D:
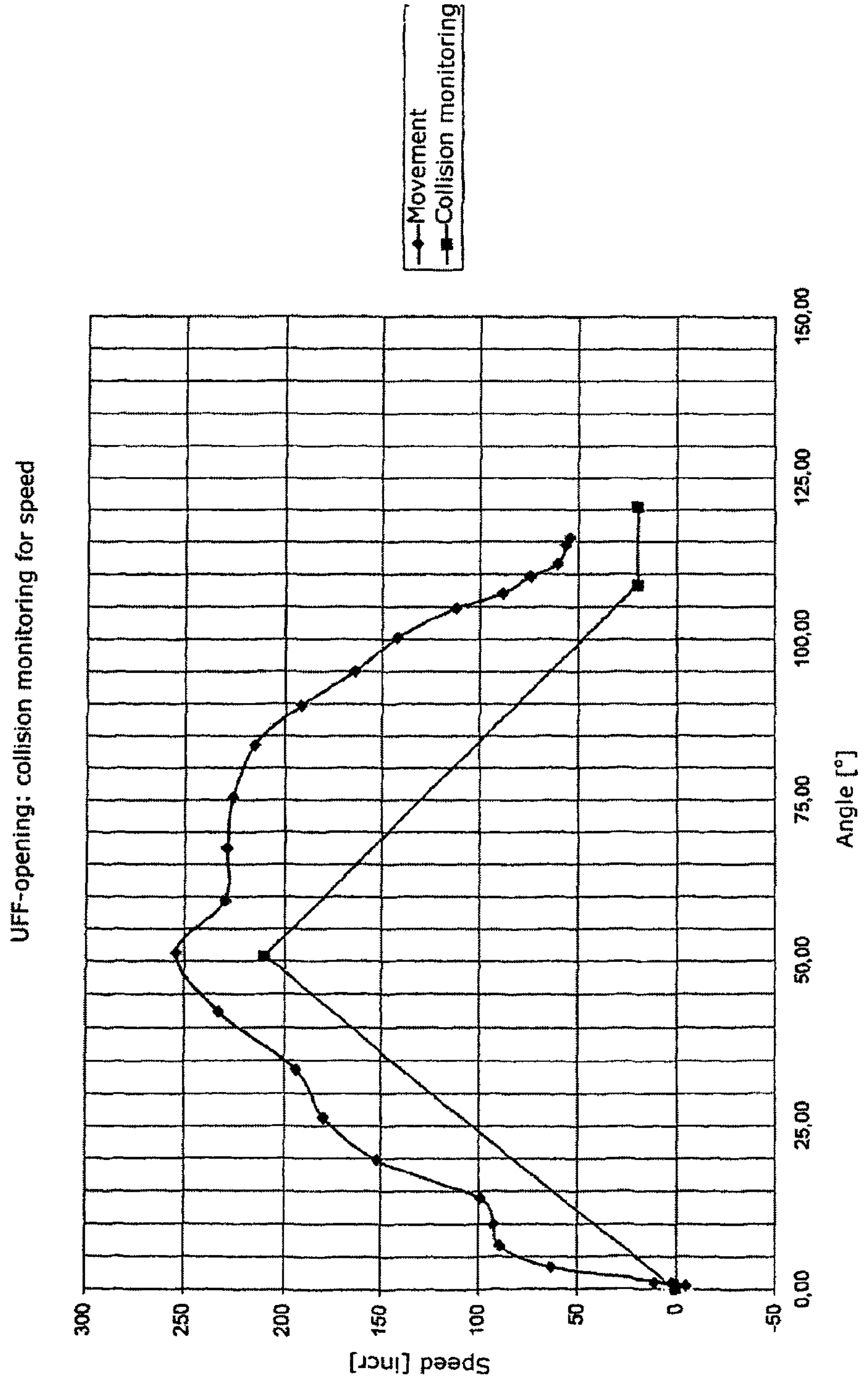

FIG. 4*d* shows how collision monitoring is set up while retaining a predetermined offset for the parameter 'speed'. In that case, in all embodiments, collision monitoring can be based either only on one of the specified parameters (for example angular speed $\omega$ or angular acceleration a) or on combinations of the parameters. In particular, the collision monitoring device 35 includes a speed measuring device 40 and/or an acceleration measuring device 45.

Figure 5A:
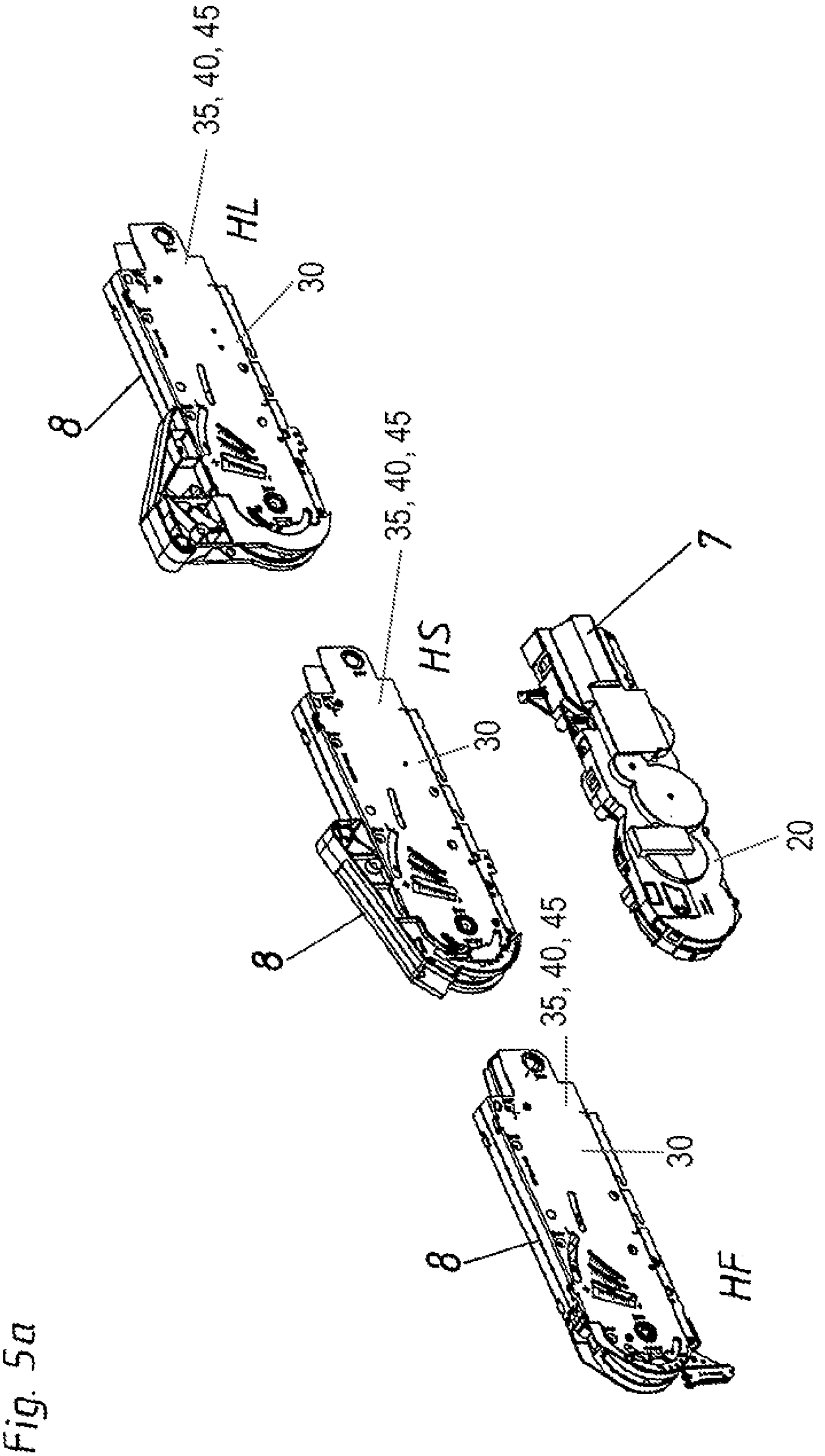
FIGS. 5*a* and 5*b* show an embodiment of a first component to which three second components of differing configurations can be fixed, as a perspective view and corresponding plan views.
Figure 5B:
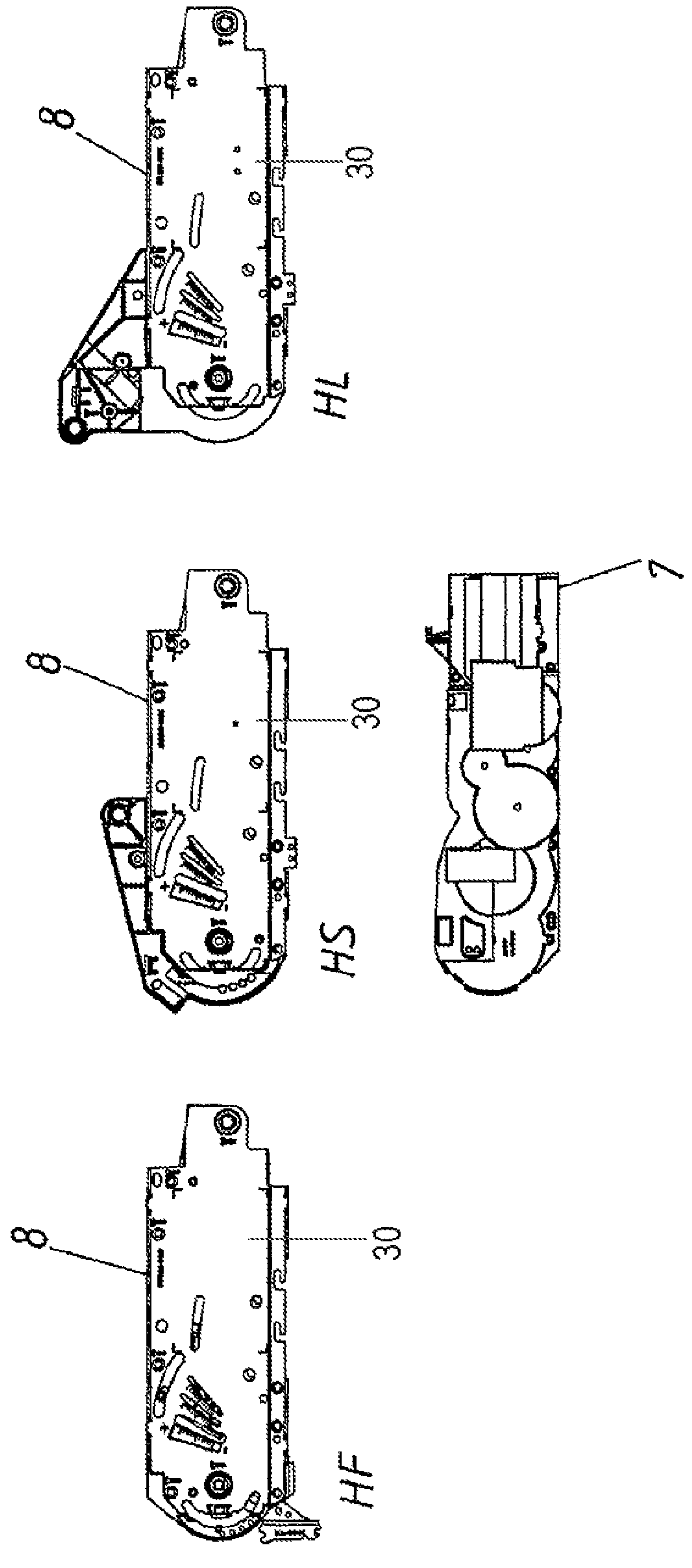

FIGS. 5 and 5*b* diagrammatically show the principle of an embodiment whereby the furniture drive 1 in each case comprises two components 7, 8 which are releasably secured to each other (in addition it would be possible to provide a cover flap which can be seen in FIG. 2). The electric motor 20 and the corresponding electronic circuits are in this case arranged in the first component 7. The mechanical control unit is in the form of the second component 8. Depending on which respective type of furniture flap is to be used, a corresponding second component 8 is used.

FIG. 6 shows a first component 7 equipped with a reading device 25 used for reading out a coding 30 arranged on the second component 8.

In the illustrated embodiment, the reading device 25 has two resiliently mounted pins 9 (see FIG. 6*b*) which can be pressed into the first component 7 and then close an electric contact, this being registered by the identification device 15.

Figures 6A, 6B, 6C, 6D, 6E:
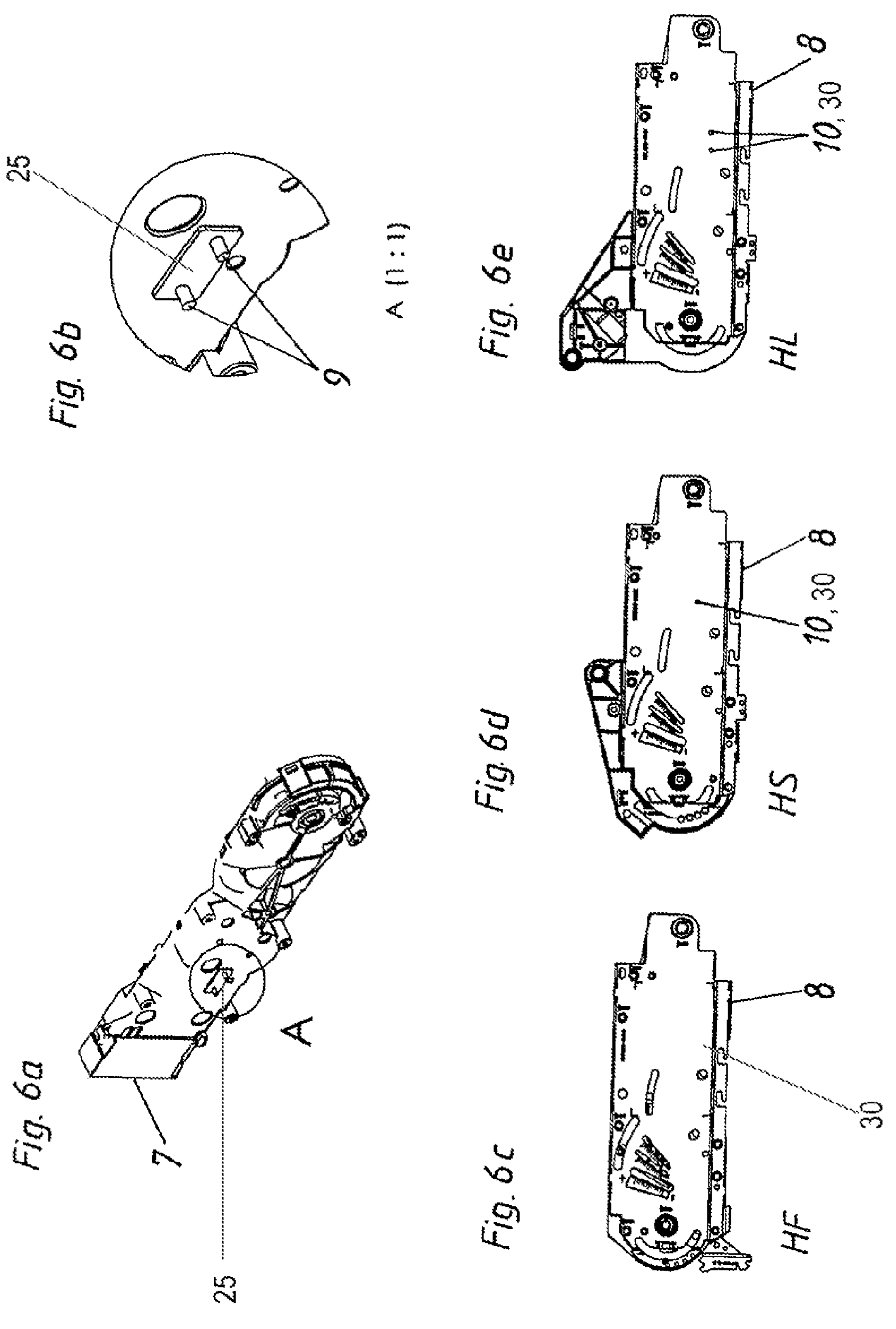
FIGS. 6*a* through 6*e* show an embodiment of an identification device in which different codings are arranged on the second component and the first component has a corresponding reading device.

In the present example, the coding 30 is in the form of bores 10 (or lack thereof). In particular, the second component 8 has no bore for an upwardly foldable flap (FIG. 6*c*), the component 8 has a bore 10 for an upwardly pivotable flap (FIG. 6*d*) and the second component 8 has two bores 10 for an upward lift flap (FIG. 6*d*). Those bores 10 are positioned so that when the first component 7 and the second component 8 are assembled, no pin (in the case of UFF), one pin (in the case of UPF) or both pins 9 (in the case of ULF) can penetrate into a bore 10. When a pin 9 penetrates into a bore 10 it is not pushed into the first component 7 and therefore does not close an electric contact. Thus identification of the second component 8 can be effected by this coding 30.

Alternatively, a transponder can be disposed on the second component 8 and on the first component 7 can be a corresponding reading unit.

Figure 7B:
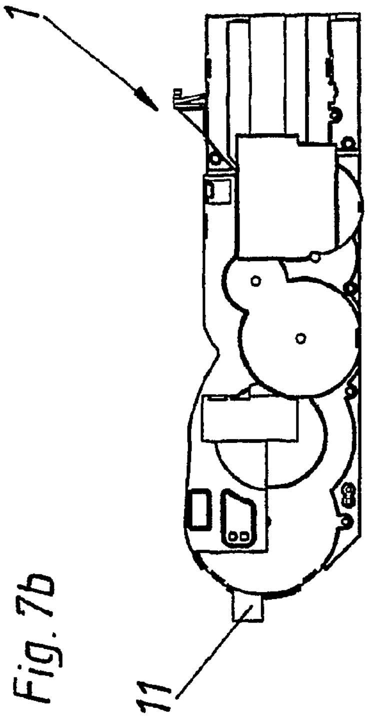
FIGS. 7*a*, 7*b* and 7*c* show a further embodiment of an identification device having an optical sensor.
Figure 7C:
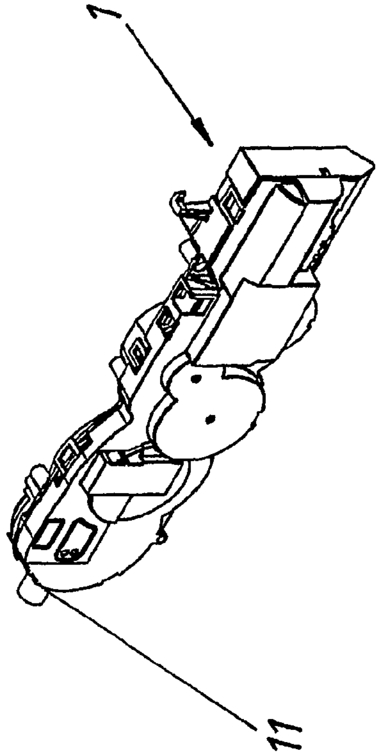
Figure 7A:
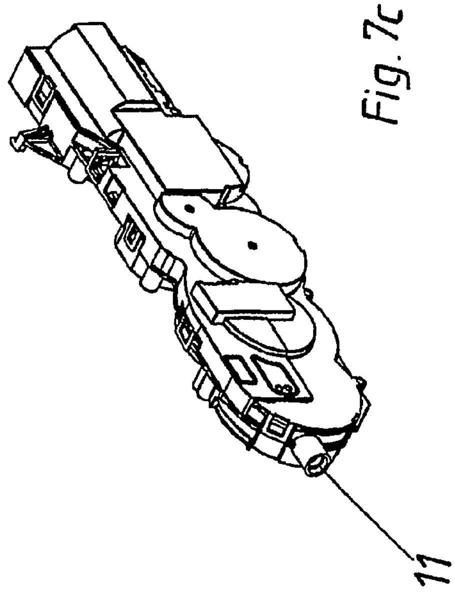

In the embodiment of FIG. 7, the furniture drive 1 is provided with an optical sensor 11, the measurement signals of which can be fed to a distance measuring device. That is, in turn, connected to an identification device. The mode of operation is shown in FIG. 8 for different types of furniture flap.

It can be seen for example that, with a furniture flap 3 in the form of an upwardly foldable flap (UFF), folding the furniture flap 3 together brings about a situation in which the measurement beam (indicated by a horizontal broken line) of the optical sensor 11 is no longer incident on the furniture flap 3. It can be concluded therefrom that this involves an upwardly foldable flap.

Figures 8A, 8B, 8C, 8D:
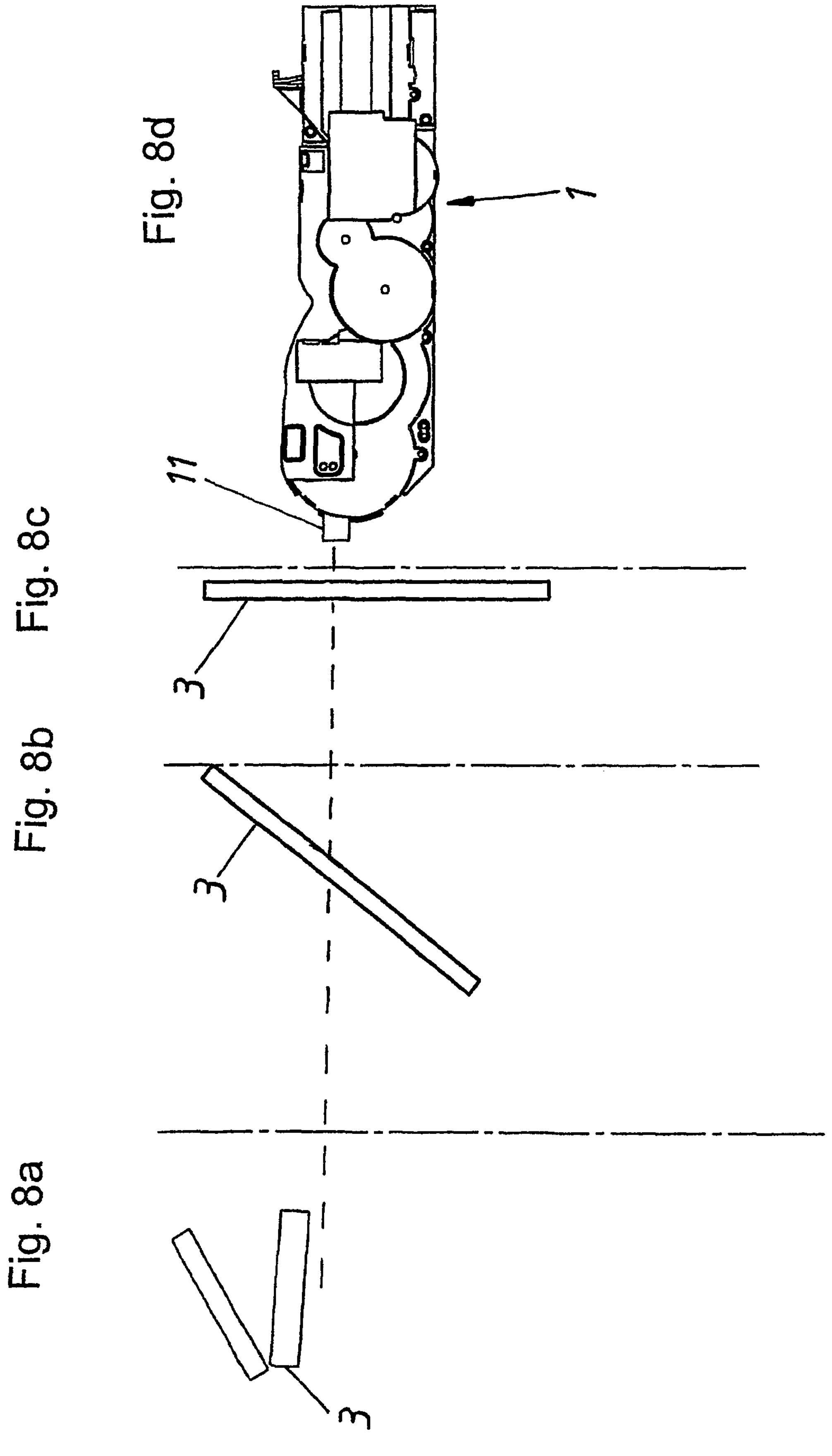
FIGS. 8*a* through 8*d* show an application of the FIG. 7 embodiment.

In FIG. 8*b* there is an upwardly pivotable flap (UPF). It will be seen that the spacing of the upwardly pivotable flap from the vertical broken line (the spacing of the optical sensor 11 from the broken vertical line is to be the same in all of FIGS. 8*a* through 8*d*) is greater than the spacing which is present for example in the case of FIG. 8*c*, where the furniture flap 3 is in the form of an upward lift flap.

Identification of the type of furniture flap can be effected by the identification device 15 in that way.

It may be advantageous, during the reference travel, to implement an error check to the effect that it is noted whether the furniture flap 3 has covered a certain minimum travel (minimum angular travel distance). Otherwise a problem can occur that, in the event of a collision of the furniture flap 3, before the end position is reached, incorrect identification of the type of flap occurs, which also has the consequence that the electric motor only travels over a limited angular range.

Figure 9B:
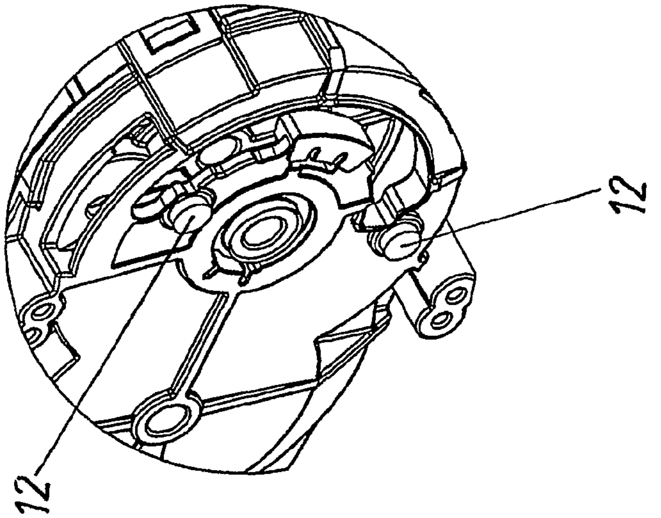
FIGS. 9*a* and 9*b* show a further embodiment of an identification device having inductive sensors.
Figure 9A:
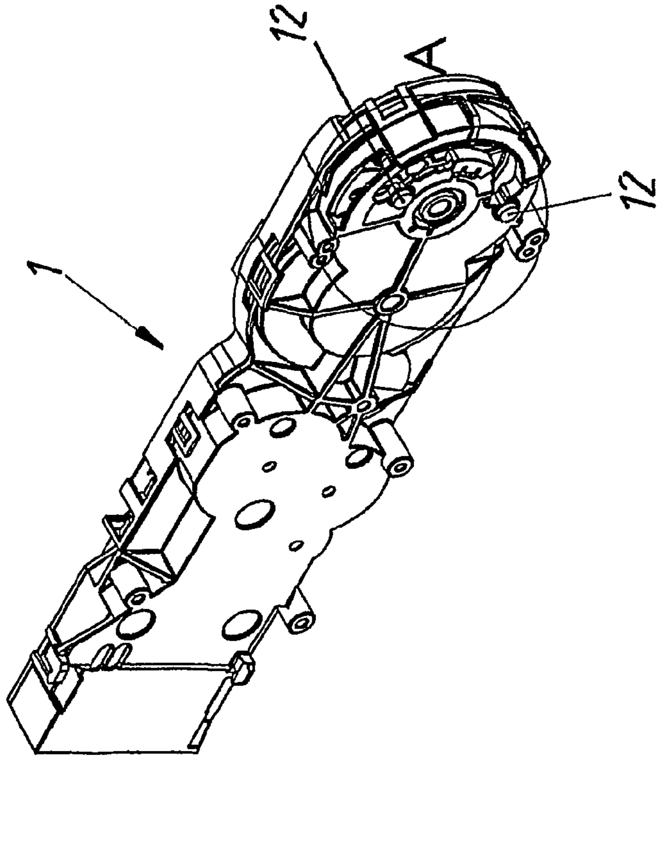

The embodiment of FIG. 9 has two inductive sensors 12 connected to the identification device. Depending on the respective type of furniture flap 3, in a complete movement of the furniture flap 3, a lever or a control arm 4 of the lever mechanism passes over a differing number of inductive sensors 12. For example, in the case of a furniture flap 3 in the form of an upwardly foldable flap (UFF), it does not pass over either of the two inductive sensors 12. In the case of a furniture flap 3 in the form of an upwardly lifting flap (ULF), it passes over one of the two inductive sensors 12. In the case of a furniture flap 3 in the form of an upwardly pivoting flap (UPF), it passes over both inductive sensors 12.

LEGEND $\omega$ angular speed
$\alpha$ angular acceleration
$\phi$ angle
$\phi_{UP}$ upper end position
$\phi_{DOWN}$ lower end position
$\Delta\phi$ ascertained angular range
$\phi_{LEVEL\_UFF}$ limit value angle for UFF detection
$\phi_{LEVEL\_ULF}$ limit value angle for ULF detection
$\phi_{OFF}$ angle offset
$\omega_{THRESHOLD}$ threshold value for angular speed at which the end position is detected (furniture flap is in the stopped condition)

The invention claimed is:

1. An electric furniture flap drive comprising:

a control arm to be connected to one of an upward pivotable flap, an upward fold flap, and an upward lift flap;

an identification device for automatically identifying the one of the upward pivotable flap, the upward fold flap, and the upward lift flap connected to said control arm; and a travel measuring device connected to said identification device, said travel measuring device being configured to determine an amount of travel in the form of an angular range covered by said control arm between a first end position and a second end position opposite the first end position, said identification device being configured to identify the one of the upward pivotable flap, the upward fold flap, and the upward lift flap based on a measurement result from said travel measuring device, wherein the measurement result comprises the angular range covered by said control arm between the first end position and the second end position.

2. The furniture flap drive of claim 1, further comprising:

a first component having an electric motor and said identification device; and a second component attached to said control arm, said first component and said second component being releasably fixed to each other.

3. The furniture flap drive of claim 1, further comprising an optical sensor connected to said identification device for measuring a spacing between said optical sensor and the one of the upward pivotable flap, the upward fold flap, and the upward lift flap.

4. The furniture flap drive of claim 1, further comprising at least two inductive sensors connected to said identification device and arranged along a pivotal range of said control arm.

5. The furniture flap drive of claim 1, further comprising:

a first component having a reading device connected to said identification device; and a second component attached to said control arm and having a coding corresponding to one of the upward pivotable flap, the upward fold flap, and the upward lift flap to be connected to said control arm, said reading device of said first component being configured to read said coding of said second component to identify the one of the upward pivotable flap, the upward fold flap, and the upward lift flap.

6. The furniture flap drive of claim 1, wherein said travel measuring device is an angle measuring device.

7. The furniture flap drive of claim 1, further comprising an electric motor and a control unit configured to establish control or regulating parameters for said electric motor based on the identification of the one of the upward pivotable flap, the upward fold flap, and the upward lift flap by said identification device.

8. The furniture flap drive of claim 1, further comprising a collision monitoring device for detecting a collision of the one of the upward pivotable flap, the upward fold flap, and the upward lift flap with a furniture carcass or a foreign body.

9. The furniture flap drive of claim 8, wherein said collision monitoring device includes at least one of a group consisting of a speed measuring device and an acceleration measuring device for measuring said control arm.

10. An arrangement comprising:

an article of furniture including one of an upward pivotable flap, an upward fold flap, and an upward lift flap; and said furniture flap drive of claim 1, wherein said control arm is connected to said one of said upward pivotable flap, said upward fold flap, and said upward lift flap.

11. An electric-motor furniture flap drive comprising:

a control arm to be connected to a furniture flap;

an identification device for automatically identifying a type of the furniture flap to be connected to said control arm;

a first component having a reading device connected to said identification device; and a second component attached to said control arm and having a coding corresponding to the type of the furniture flap to be connected to said control arm, said reading device of said first component being configured to read said coding of said second component to identify the type of the furniture flap to be connected to said control arm.

12. The furniture flap drive of claim 11, further comprising:

a first component having an electric motor and said identification device; and a second component attached to said control arm, said first component and said second component being releasably fixed to each other.

13. The furniture flap drive of claim 11, further comprising an optical sensor connected to said identification device for measuring a spacing between said optical sensor and the furniture flap.

14. The furniture flap drive of claim 11, further comprising at least two inductive sensors connected to said identification device and arranged along a pivotal range of said control arm.

15. The furniture flap drive of claim 11, further comprising a travel measuring device connected to said identification device, said travel measuring device being configured to determine an amount of travel covered by said control arm between a first end position and a second end position opposite the first end position, said identification device being configured to identify the type of the furniture flap based on a measurement result from said travel measuring device.

16. The furniture flap drive of claim 15, wherein said travel measuring device is an angle measuring device.

17. The furniture flap drive of claim 11, further comprising an electric motor and a control unit configured to establish control or regulating parameters for said electric motor based on the identification of the type of the furniture flap by said identification device.

18. The furniture flap drive of claim 11, further comprising a collision monitoring device for detecting a collision of the furniture flap with a furniture carcass or a foreign body.

19. The furniture flap drive of claim 18, wherein said collision monitoring device includes at least one of a group consisting of a speed measuring device and an acceleration measuring device for measuring said control arm.

* * * * *